June 30, 1925.  E. SCHULTZ  1,544,349
SWIVEL CASTER AND BRACKET
Filed Oct. 15, 1923
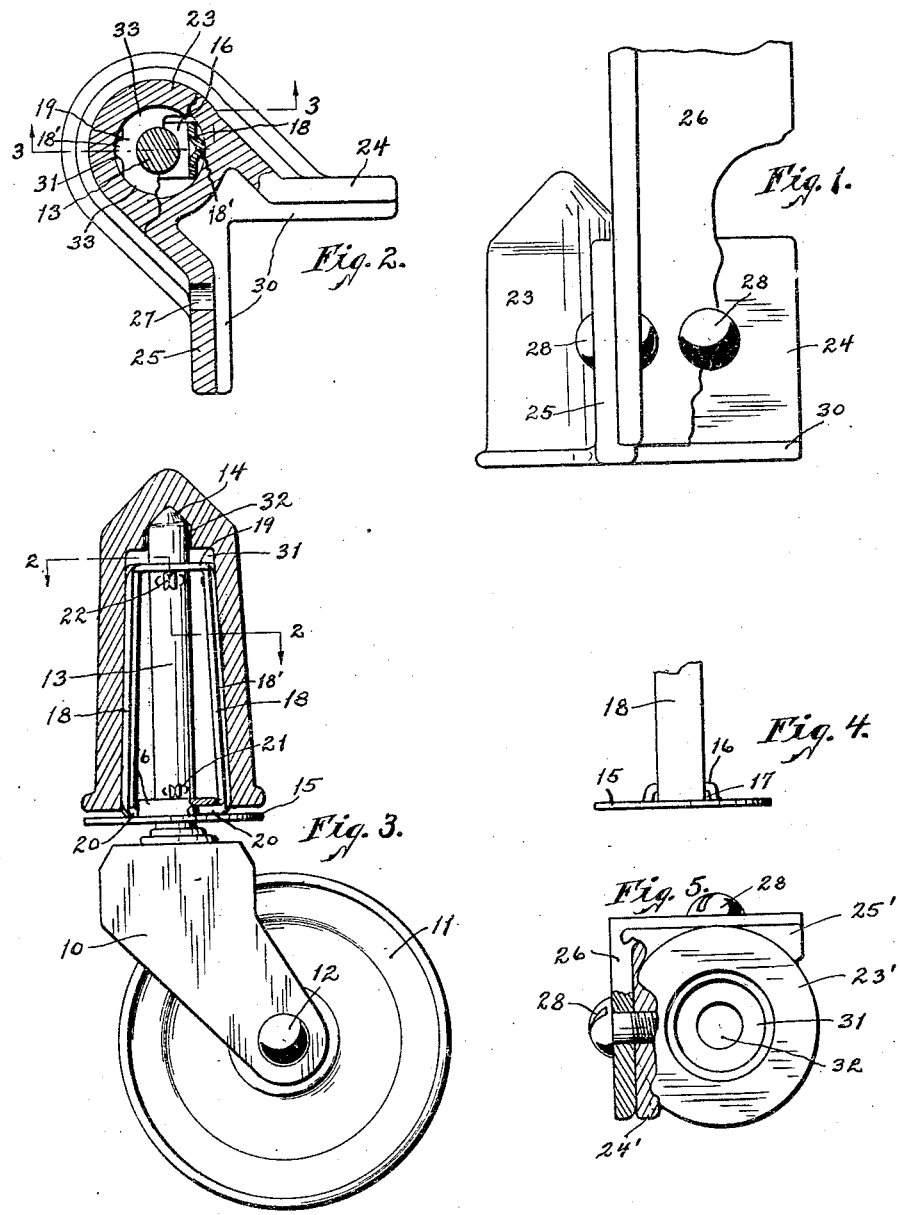
Inventor:
EDWARD SCHULTZ
by Earl M. Sinclair Atty.

Patented June 30, 1925.

1,544,349

UNITED STATES PATENT OFFICE.

EDWARD SCHULTZ, OF CHICAGO, ILLINOIS, ASSIGNOR TO JAMES B. LADD, OF DES MOINES, IOWA.

SWIVEL CASTER AND BRACKET.

Application filed October 15, 1923. Serial No. 668,610.

*To all whom it may concern:*

Be it known that I, EDWARD SCHULTZ, a citizen of the United States of America, and resident of Chicago, Cook County, Illinois, have invented a new and useful Swivel Caster and Bracket, of which the following is a specification.

An object of this invention is to provide an improved construction for a swivel caster and bracket therefor through which the load is applied to the caster stem in such manner that easy swiveling is insured and a minimum of stress is placed upon the resilient centering and retaining device.

A further object of this invention is to provide an improved caster-receiving bracket adapted to be applied to an angle-iron load object, and which may be adapted with little change to either the outside or the inside of the angle member.

With these and other objects in view, my invention consists in the construction, arrangement and combination of elements hereinafter set forth, pointed out in my claims and illustrated by the accompanying drawing, in which—

Figure 1 is an elevation showing the improved bracket mounted on the outside of an angle-iron leg, a portion of which is broken away. Figure 2 is a cross-section, on the line 2—2 of Figure 3, showing the bracket detached and with the caster stem and centering and retaining members arranged therein. Figure 3 is an elevation of the caster and bracket assembled, partly in section on the line 3—3 of Figure 2. Figure 4 is a detail elevation of a portion of the centering and retaining device.

Figure 5 is a bottom plan, partly in section, illustrating how the bracket may be modified for use on the inside of an angle member.

In the construction of the devices as shown the numeral 10 designates generally the fork or yoke of a swivel caster, in which fork or yoke a wheel 11 is journaled for rotation on a pin or axle 12. Fixed to and rising from the closed upper end of the fork 10 is a stem 13, provided at its upper end with a substantially cone-shaped point 14, preferably somewhat blunted. A disk plate 15 is rotatably mounted on the lower portion of the stem 13, and is slit or slotted transversely on spaced lines and pressed upwardly to form a boss 16 centrally apertured to receive the stem and having side-opening slots 17. A spring arch or yoke 18 is provided, having substantially parallel legs closed or connected at their upper ends by a plate 19 arranged horizontally, and said plate 19 is formed with an aperture by which it is loosely and pivotally mounted on the upper portion of the stem 13 so that said stem projects somewhat above said plate. The legs of the yoke 18 are turned inwardly at their lower ends to form flanges 20 adapted to be projected into the side-opening slots 17 of the boss 16. After the spring yoke 18 and plate 15 are assembled on the caster stem, the latter member is burred at 21 just above said plate 15, and at 22 just below the upper end member 19 of the yoke, to limit sliding movement of the stem through said members, the spring yoke and disk plate 15 comprising the caster centering and retaining devices.

A bracket member is provided, comprising a substantially cylindrical socket member 23 having wings or flanges 24, 25 formed on or fixed thereto, projecting laterally at right angles to each other. In the form shown specifically in Figures 1 and 2 the socket member 23 is located outside of the angle formed by the wings 24, 25, and the device is adapted to be mounted on the outside of the angle formed by an angle-iron leg, such as 26, forming a portion of a load object to which the caster is to be applied. The flanges or wings 24, 25 are formed with apertures 27 (Figure 2) to receive bolts, rivets or other securing means 28 passing through the members of the angular load object, so that the bracket device is firmly attached thereto. The wings 29 may be formed with shoulders 30 at their lower ends to receive the lower end of the load object. The cylindrical socket member 23 is formed with a substantially cylindrical bore or socket 31 opening to its lower end, and to the upper end of said bore or socket there opens a bore or recess 32 of smaller diameter and considerably less length and preferably tapered at its upper end to conform substantially to the pointed upper end of the stem 13.

The arms or legs of the yoke 18, which is formed of spring metal, are adapted to be received frictionally within the bore or socket 31 and to be compressed somewhat by contact with the walls thereof, the flanges 20 moving slidably in the side-opening slots 17 during such movement. When completely inserted, the stem 13 of the caster enters at its projecting upper end the smaller bore or recess 32 and engages the upper end thereof as shown in Figure 3, the weight being transferred by and through the closed upper end of the socket member 23 upon the upper end of the stem. The bore or recess 32 preferably is of somewhat greater diameter than the stem 13, so that there is a slight clearance around the stem and the weight is applied entirely at the upper end and friction is reduced. When the caster is thus inserted relative to the bracket, the lower end of the bracket is spaced above the disk plate 15 and the closing plate 19 at the upper end of the spring yoke is spaced below the upper end of the bore or socket 31, so that the weight does not come upon the centering and retaining devices. This prevents buckling or other distortion of the yoke arms or disk plate under stress and strain in use, and application of the weight at the upper end of the stem facilitates the swiveling operation. The margins of the upper end member or plate 19 of the spring yoke, between the arms thereof, preferably are formed arcuate to fit the walls of the socket or bore 31, at the points 33 in Figure 2, thus tending to prevent lateral movement of the upper end of the yoke in the socket.

In the construction according to Figure 5 the socket member 23' is shown as formed within the angle produced by the wings 24', 25', and the bracket thus formed is adapted to be mounted inside of an angle member such as 26 and be secured thereto. In all other respects the construction and arrangement is the same, and the method of mounting the caster in the bracket is the same, as previously described.

Each arm of the spring yoke 18 may be formed with a vertical, outwardly projecting rib or bead 18', concavo-convex in cross-section, as shown in Figures 2 and 3. This rib or bead not only strengthens the arms of the yoke, but also stiffens them and gives them a greater tension when compressed, and in addition, by contacting at the outermost point with the wall of the socket, adds to the frictional engagement and tends to prevent accidental withdrawal of the centering device.

I claim as my invention—

1. The combination with a caster having a stem and a resilient retaining device pivotally mounted on said stem and having a substantially horizontal portion lying wholly below the upper end thereof, of a bracket including a substantially cylindrical socket, said socket opening downwardly to receive said stem and centering device, said bracket being formed with a bore of smaller diameter communicating with the upper end of said socket, fitted to and having a bearing on the upper end of said stem.

2. The combination with a caster having a stem and a resilient retaining device mounted on said stem and located wholly below the upper end thereof, of a bracket formed with attaching wings and also formed with a downwardly opening, substantially cylindrical socket, said retaining device being adapted to enter said socket and frictionally engage the walls thereof, means to limit movement of said stem in said retaining device, said retaining device including a substantially horizontal plate through which said caster stem extends loosely and pivotally, and a bore of smaller diameter opening from the upper end of said socket and adapted to receive the projecting upper end of the stem, said bore being fitted to the upper end of the stem and adapted to transfer the weight of the bracket thereto.

3. The combination with a caster having a stem and a resilient retaining device including a spring yoke embracing said stem and closed at its upper end by a substantially horizontal portion, said stem projecting pivotally through the closed upper end of said yoke, of a bracket formed with attaching means and also with a downwardly opening, substantially cylindrical socket, said spring yoke adapted to enter said socket and frictionally engage by its arms the walls thereof, the closed upper end of said spring yoke substantially fitting said socket transversely, and a bore of smaller diameter opening from the upper end of said socket and adapted to receive and bear upon the projecting end of said stem.

Signed at Chicago, in the county of Cook and State of Illinois, this 6th day of September, 1923.

EDWARD SCHULTZ.